United States Patent Office 3,219,671

Patented Nov. 23, 1965

3,219,671

SUBSTITUTED 6-DEOXYTETRACYCLINES AND 6-DEMETHYL-6-DEOXYTETRACYCLINES

Joseph J. Hlavka, New City, N.Y., assignor to American Cyanamid Company, New York, N.Y., a corporation of Maine No Drawing. Filed Apr. 14, 1961, Ser. No. 102,943
16 Claims. (Cl. 260—349)

This invention relates to new compounds of the tetracycline family and more particularly is concerned with novel substituted 6-deoxytetracyclines and 6-demethyl-6-deoxytetracyclines which may be represented by the following general formula:

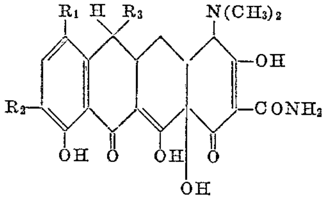

wherein $R_1$ and $R_2$ are hydrogen, azido, lower alkanoyloxy, haloalkanoyloxy and lower alkoxythiocarbonylthio with the proviso that both may not be hydrogen and $R_3$ is hydrogen or methyl. The invention also includes the non-toxic acid addition salts of the new tetracycline derivatives.

The novel tetracyclines of this invention are, in general, yellow solids, relatively soluble in water, methanol, ethanol, acetic acid, and the like, and relatively insoluble in benzene, toluene, ether, petroleum ether, and the like. The compounds may, generally, be crystallized from alcohol-ether, alcohol-benzene, and like solutions. Characteristic of tetracyclines generally, the compounds of this invention are amphoteric solids having wide melting ranges above 150° C.

The new tetracyclines of this invention are biologically active and have the broad-spectrum anti-bacterial activity of the previously known tetracyclines. The antibacterial spectrum of certain of these compounds, representing the amount required to inhibit the growth of various typical bacteria, was determined in a standard manner by the agar dilution streak plate technique which is commonly used in testing new antibiotics. The minimal inhibitory concentrations, expressed in gammas per milliliter, against various test organisms are reported in the table below. For comparison purposes, the antibacterial activity of tetracycline against the same organisms is also included.

TABLE 1

| Organism | Tetracycline | 7-Acetoxy-6-demethyl-6-deoxytetracycline | 7-Ethoxythiocarbonylthio-6-demethyl-6-deoxytetracycline | 7-Azido-6-demethyl-6-deoxytetracycline | 9-Azido-6-demethyl-6-deoxytetracycline |
|---|---|---|---|---|---|
| *Mycobacterium ranae* | 1 | ---------- | 8 | 2 | 2 |
| *Mycobacterium smegmatis* ATCC 607 | 2 | 1 | 15 | 2 | 2 |
| *Staphylococcus aureus* 209P | 1 | 2 | 8 | 1 | 4 |
| Streptococcus 8043 | 2 | 4 | 8 | 1 | 4 |
| *Bacillus subtilis* ATCC 6633 | 0.5 | 0.5 | 1 | .25 | 1 |
| *Streptococcus pyogenes* C203 | 0.25 | 1 | 1 | .25 | 2 |
| *Streptococcus* α No. 11 | >250 | 15 | 15 | 4 | 15 |
| *Staphylococcus albus* No. 69 | 250 | 31 | 8 | 8 | 15 |
| *Streptococcus* β No. 80 | 250 | 8 | 15 | 4 | 8 |
| *Staphylococcus aureus* NY 104 | 1 | 4 | 8 | 2 | 4 |
| *Bacillus Cereus* No. 5 | .5 | 0.5 | 8 | .5 | 1 |
| *Proteus vulgaris* 9484 | 15 | 4 | 31 | 2 | 8 |
| *Escherichia coli* ATCC 9637 | 62 | 31 | >250 | 15 | 31 |
| *Salmonella gallinarum* | 15 | 15 | >250 | 31 | 62 |
| *Escherichia coli* No. 22 | 2 | 8 | 250 | 8 | 8 |

From the above it will be observed that in many respects the antibacterial spectrum of the new derivatives closely parallels that of tetracycline but that in addition certain of the new compounds have a biological assay of from 1.5 to 2.5 times that of tetracycline against *Staphylococcus aureus* as measured by the standard turbidimetric assay [Assay of the New York Academy of Science, 51, 218 (1948)].

In addition, the new derivatives are extremely effective in vitro and in vivo against certain tetracycline resistant strains of bacteria. For example, the compounds of this invention are from 30 to 80 times as active as tetracycline against the tetracycline-resistant organisms Streptococcus α No. 11, *Staphylococcus albus* No. 69 and Streptococcus β-hemolytic strain No. 80.

Additionally, certain of these compounds have shown high activity in vitro against the resistant microorganisms Staphylococcus Smith and Staphylococcus Rose. Staphylococcus Smith was derived from a strain studied at the Rockefeller Institute and was obtained from Sharp and Dohme. Stahpylococcus Smith is coagulase positive, tellurite negative and is sensitive to tetracycline, penicillin, streptomycin, erythromycin, carbomycin, neomycin, chloramphenicol and novobiocin in vitro. Attempts have been made for phage typing of this strain but it has been determined that it is non-typable.

*Staphylococcus aureus*, variety Rose (ATCC No. 14,154) was isolated clinically from an abscess of a patient who did not respond to treatment with the tetracyclines. This organism has been found to be resistant to the clinically used tetracyclines in vitro. Staphylococcus Rose is coagulase and tellurite positive and is resistant to tetracycline, penicillin, streptomycin and erythromycin. It is sensitive to carbomycin, neomycin, chloramphenicol and novobiocin in vitro. Staphylococcus Rose has been phage-typed with the following results:

| | Phage pattern |
|---|---|
| *Staphylococcus aureus* variety Rose | 80/81 |

Certain of the new tetracyclines of this invention have been tested in vitro against Staphylococcus Smith and Staphylococcus Rose along with typical tetracyclines clinically in use. The antibacterial activities so obtained expressed in minimal inhibitory concentrations in gammas per milliliter are shown in the table below:

TABLE 2

| | Staphylococcus Smith | Staphylococcus Rose |
|---|---|---|
| Tetracycline | 0.25 | 250 |
| Demethyltetracycline | 0.25 | 125 |
| Demethylchlortetracycline | 0.12 | 125 |
| 7-Azido-6-demethyl-6-deoxytetracycline | 0.25 | 2 |
| 9-Azido-6-demethyl-6-deoxytetracycline | 0.5 | 2 |
| 7-Acetoxy-6-demethyl-6-deoxytetracycline | 0.06 | 8 |

As indicated, the antibacterial activity of the new derivatives is equal to and in many respects superior to that of tetracycline and thus the new compounds may be administered by the physician in the same manner and in approximately the same dosages as with the tetracycline compounds currently in use. Moreover, since the new compounds show the typical broad-spectrum antibacterial activity of the previously known tetracyclines, they may be used in the treatment of various tetracycline, chlortetracycline or demethylchlortetrative bacteria where treatment of such infections with tetracycline, chlortetracycline or demethylchlortetracycline is indicated.

The new compounds of this invention are prepared from the corresponding tetracycline diazonium salts described in the copending application of Joseph P. Petisi and James H. Boothe, Serial No. 65,584, filed October 28, 1960. As therein described, 6-dimethyl-6-deoxytetracycline-7-diazonium sulfate hydrochloride, for example, may be prepared by nitrating 7-amino-6-demethyl-6-deoxytetracycline sulfate [J.A.C.S. 82, 1253 (1960)] suspended in a suitable mineral acid, e.g. methanolic hydrogen chloride.

The new derivatives of this invention are then prepared by reacting the appropriate tetracycline diazonium salt with hydrazoic acid or a lower alkyl xanthic acid such as ethyl xanthic acid, or a lower alkyl carboxylic acid such as acetic acid, dichloroacetic acid, etc. under conditions such as to effect displacement of the diazonium radical with an azido, acetoxy, formyloxy or lower alkyl xanthate radical.

Generally, the reaction is carried out in water, alcoholic hydrogen chloride, or an excess of reactant, such as formic or acetic acid, at temperatures ranging from 0–50° C., conveniently at room temperature, for a period of time ranging from a few minutes to several hours or longer.

When, however, a tetracyclinediazonium salt is reacted with an alkanoic acid to prepare a lower alkanoyloxytetracycline, the reaction must be energized by ultraviolet radiation. It has been found that ultraviolet radiation in the range of 200 to 450 m$\mu$ is an effective energizer for the reaction.

Isolation and purification of the compounds of this invention are effected by conventional methods such as precipitation, solvent evaporation, lyophilization, crystallization, column chromatography, and the like.

The new tetracyclines of this invention are amphoteric compounds and hence acid addition salts may be readily prepared. In general, the preferred acids are the non-toxic pharmaceutically acceptable acids, e.g., the mineral acids such as hydrochloric acid, sulfuric acid and the like although organic acids such as trichloroacetic acid may also be used. The acid addition salts of the new tetracyclines may be prepared by treating the amphoteric compound with approximately two equivalents or more of the chosen acid. Preferably the tetracycline is suspended in a suitable solvent during the acidification.

The invention will be described in greater detail in conjunction with the following specific examples.

*Example 1*

PREPARATION OF 7-AZIDO-6-DEMETHYL-6-DEOXYTETRACYCLINE SULFATE

To a cold solution of 100 milligrams (0.19 mmole) of 7 - amino - 6 - demethyl - 6 - deoxytetracycline sulfate [J.A.C.S. 82, 1253 (1960)] in 1 milliliter of methanolic hydrogen chloride at ice bath temperature was added 0.1 milliliter of n-butyl nitrite. The reactive mixture was stirred at this temperature for 30 minutes and slowly poured into 100 milliliters of ether yielding 95 milligrams of 6 - demethyl - 6 - deoxytetracycline - 7 - diazonium sulfate hydrochloride.

To a solution of 1.0 gram (1.71 mmole) of 6-demethyl-6-deoxytetracycline-7-diazonium sulfate hydrochloride in 30 milliliters of 0.1 N hydrochloric acid in methanol was added 0.113 milligrams (1.75 mmole) *of* sodium azide. The solution was stirred at room temperature for two hours then slowly poured into 1 liter of ether. The solid was filtered and dried, yield, 0.9 gram. 100 milliliters of this material was dissolved in 2.0 milliliters of methanol and ether was added to the cloud point. This was filtered and ether again added to the cloud point. Again this was filtered and the filtrate on standing at 0° C. for 2 days deposited 20 milligrams of crystalline 7-azido-6-demethyl-6-deoxytetracycline sulfate.

*Example 2*

PREPARATION OF 7-ETHOXYTHIOCARBONYLTHIO-6-DEMETHYL-6-DEOXYTETRACYCLINE

A mixture of 100 milligrams (0.171 mmole) of 6-demethyl - 6 - deoxytetracycline-7-diazonium sulfate hydrochloride and 50 milligrams (0.314 mmole) of potassium ethyl xanthate in 3.0 milliliters of water was stirred at room temperature for 5 minutes. The solution was freeze-dried yielding 0.12 of product. This material was purified by column chromatography.

*Example 3*

PREPARATION OF 7-ACETOXY-6-DEMETHYL-6-DEOXYTETRACYCLINE

A solution of 600 milligrams (1.026 mmole) of 6-demethyl - 6 - deoxytetracycline - 7 - diazonium sulfate hydrochloride in a mixture of 200 milliliters of glacial acetic acid and 2 milliliters of water was irradiated with an ultraviolet lamp for 5½ hours. The solution was freeze-dried and the residue purified by column chromatography.

*Example 4*

PREPARATION OF 9-AZIDO-6-DEMETHYL-6-DEOXYTETRACYCLINE HYDROCHLORIDE

To a solution of 1.0 gram (0.002 mole) of 9-amino-6-demethyl-6-deoxytetracycline hydrochloride [J.A.C.S. 82, 1253 (1960)] in 23 milliliters of 0.1 N methanolic HCl, cooled to 0–5° C., was added 1.0 milliliter (0.009 mole) of n-butyl nitrite. The solution was stirred at this temperature for fifteen minutes and then poured into 1500 milliliters of cold ether. The solid which separated was filtered, washed with ether, and dried, yielding 0.98 grams of 6-demethyl-6-deoxytetracycline-9-diazonium oxide hydrochloride.

To a solution of 5.0 grams (0.105 mole) of 6-demethyl-6-deoxytetracycline - 9 - diazonium oxide hydrochloride in 125 milliliters of 0.1 N methanolic hydrogen chloride was added 750 milligrams (0.11 mole) of sodium azide. The solution was stirred at room temperature for 45 minutes. The solid that separated was filtered and dried, yield 2.5 grams. The filtrate was poured into 1500 milliliters of ether yielding 1.5 grams more of product. The product was crystallized from methanol-ether.

*Example 5*

PREPARATION OF 9-FORMYLOXY-6-DEMETHYL-6-DEOXYTETRACYCLINE HYDROCHLORIDE

A solution of 100 milligrams of 6-demethyl-6-deoxytetracycline-9-diazonium oxide hydrochloride in 10 milliliters of formic acid was irradiated with an ultraviolet lamp for 2 hours. The reaction mixture was poured into 200 milliliters of dry ether and the solid filtered; yield 60 milligrams.

*Example 6*

PREPARATION OF 9-ETHOXYTHIOCARBONYLTHIO-6-DEMETHYL-6-DEOXYTETRACYCLINE

A solution of 1.0 gram (0.002 mole) of 6-demethyl-6-deoxytetracycline-9-diazonium oxide hydrochloride and 0.75 gram (0.004 mole) of potassium ethyl xanthate in 20 milliliters of 0.1 N hydrochloric acid and 30 milliliters of water was stirred at room temperature. After the evolution of nitrogen had ceased the pH of the solution was adjusted to 4.5. The solid that separated was filtered and dried; yield 0.51 gram. The material was purified by column chromatography.

*Example 7*

PREPARATION OF 9-ETHOXYTHIOCARBONYLTHIO-6-DEOXYTETRACYCLINE 3.57 milliliters of n-butyl nitrite were added to a solution of 5.00 grams (0.0078 mole) of 9-amino-6-deoxytetracycline [J.A.C.S. 82, 1253 (1960)] in 0.1 N methanolic HCl at 5–10°. The solution was stirred for 40 minutes at this temperature and then poured into one liter of cold anhydrous ether. The resulting 6-deoxytetracycline-9-diazonium disulfate was filtered, washed with ether and dried.

To a solution of 1.76 grams (0.011 mole) potassium ethyl xanthate in 40 milliliters of water was added 1.00 grams (0.015 mole) 6-deoxytetracycline-9-diazonium disulfate. The mixture was stirred for one hour at room temperature. The supernatant liquid was decanted off, the solid washed with water and freeze-dried. The product after being purified by column chromatography and neutralized gave a twenty-five percent yield of material.

*Example 8*

PREPARATION OF 7-FORMYLOXY-6-DEMETHYL-6-DEOXYTETRACYCLINE SULFATE

A one percent solution of 6-demethyl-6-deoxytetracycline-7-diazonium hydrochloride sulfate in formic acid (98–100%) was irradiated with an ultraviolet lamp for three hours at room temperature. The reaction mixture after being freeze-dried and washed with ether gave a sixty percent yield.

*Example 9*

7-DICHLOROACETOXY-6-DEMETHYL-6-DEOXYTETRACYCLINE SULFATE

A solution of 0.100 gram of (0.000175 mole) 6-demethyl-6-deoxytetracycline-7-diazonium hydrochloride sulfate in 10.0 milliliters of dichloroacetic acid was irradiated by an ultraviolet lamp for six hours at room temperature. The reaction mixture was lyophilized and the residue slurried in anhydrous ethyl ether, filtered and dried.

I claim:

1. A compound of the group consisting of those represented by the formula:

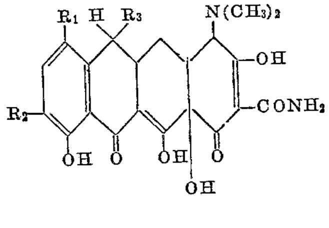

wherein $R_1$ and $R_2$ are members of the group consisting of hydrogen, azido, lower alkanoyloxy, haloalkanolyoxy and lower alkoxythiocarbonylthio with the proviso that both may not be hydrogen and $R_3$ is a member of the group consisting of hydrogen and methyl and the nontoxic acid addition salts thereof.

2. 7-azido-6-demethyl-6-deoxytetracycline.

3. 7-ethoxythiocarbonylthio - 6 - demethyl-6-deoxytetracycline.

4. 7-acetoxy-6-demethyl-6-deoxytetracycline.

5. 9-azido-6-demethyl-6-deoxytetracycline.

6. 9-formyloxy-6-demethyl-6-deoxytetracycline.

7. 9-ethoxythiocarbonylthio - 6 - demethyl-6-deoxytetracycline.

8. 9-ethoxythiocarbonylthio-6-deoxytetracycline.

9. 7-formyloxy-6-demethyl-6-deoxytetracycline.

10. 7-dichloroacetoxy - 6 - demethyl - 6 - deoxytetracycline.

11. A method of preparing a compound of the group consisting of those represented by the formula:

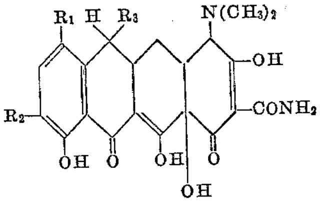

wherein $R_1$ and $R_2$ are members of the group consisting of hydrogen, azido, lower alkanoyloxy, haloalkanoyloxy and lower alkoxythiocarbonylthio with the proviso that both may not be hydrogen and $R_3$ is a member of the group consisting of hydrogen and methyl, which comprises reacting a diazonium 6-deoxytetracycline with a member of the group consisting of hydrazoic acid, a lower alkyl xanthic acid and a lower alkyl carboxylic acid, said reaction with a lower alkyl carboxylic acid being energized by ultraviolet radiation.

12. A method of preparing 7-acetoxy-6-demethyl-6-deoxytetracycline which comprises reacting 7-diazonium-6-demethyl-6-deoxytetracycline with glacial acetic acid and energizing the reaction by ultraviolet radiation.

13. A method of preparing 9-formyloxy-6-demethyl-6-deoxytetracycline which comprises reacting 9-diazonium-6-demethyl-6-deoxytetracycline with formic acid and energizing the reaction by ultraviolet radiation.

14. A method of preparing 7-formyloxy-6-demethyl-6-deoxytetracycline which comprises reacting 7-diazonium-6-demethyl-6-deoxytetracycline with formic acid and energizing the reaction with ultraviolet radiation.

15. A method of preparing 7-dichloroacetoxy-6-demethyl-6-deoxytetracycline which comprises reacting 7-diazonium-6-demethyl-6-deoxytetracycline with dichloroacetic acid and energizing the reaction with ultraviolet radiation.

16. A compound selected from the group consisting of

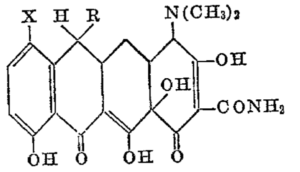

and

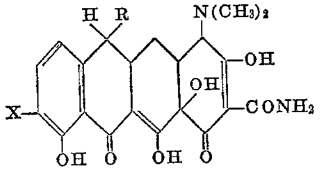

wherein X is azido and R is selected from the group consisting of hydrogen and methyl.

References Cited by the Examiner

UNITED STATES PATENTS

| | | | |
|---|---|---|---|
| 2,812,349 | 11/1957 | Gordon | 260—559 |
| 2,976,318 | 3/1961 | Blackwood | 260—559 |
| 3,002,993 | 10/1961 | Wilkinson et al. | 260—559 |

FOREIGN PATENTS

| | | |
|---|---|---|
| 5,618 | 8/1960 | Peru. |

(Other references on following page)

OTHER REFERENCES

Boothe et al.: "Journ. Am. Chem. Soc.," vol. 82, pages 1253–4 (1960).

German-Auslegeschrift, 1,090,205, October 6, 1960.

Hodgson et al.: "Journ. Chem. Soc. (London)," pages 762–3 (1949).

Lucas: "Organic Chemistry," 2nd Ed., published by American Book Co., N.Y., pages 484–88 (1953).

Noller: "Chemistry of Organic Compounds," published by W. B. Saunders Co., Phila., pages 480–84 (1951).

NICHOLAS S. RIZZO, *Primary Examiner.*

IRVING MARCUS, *Examiner.*

UNITED STATES PATENT OFFICE

CERTIFICATE OF CORRECTION

Patent No. 3,219,671 November 23, 1965

Joseph J. Hlavka

It is hereby certified that error appears in the above numbered patent requiring correction and that the said Letters Patent should read as corrected below.

Column 3, line 5, for "tetracycline, chlortetracycline or demethylchlortetra-" read -- infections produced by Gram-positive and Gram-nega- --; line 13, for "6-dimethyl-" read -- 6-demethyl- --; column 5, line 15, for "0.015" read -- 0.0015 --.

Signed and sealed this 20th day of September 1966.

(SEAL)
Attest:

ERNEST W. SWIDER
Attesting Officer

EDWARD J. BRENNER
Commissioner of Patents